US012070815B2

(12) United States Patent
Zhang et al.

(10) Patent No.: US 12,070,815 B2
(45) Date of Patent: Aug. 27, 2024

(54) ROTARY ACOUSTIC HORN

(71) Applicant: 3M INNOVATIVE PROPERTIES COMPANY, St. Paul, MN (US)

(72) Inventors: Peihui Zhang, Woodbury, MN (US); Ronald W. Gerdes, St. Paul, MN (US); Jennifer L Trice, Hugo, MN (US); Satinder K. Nayar, Woodbury, MN (US); Timothy J. Rowell, St. Paul, MN (US); Verlin W. Schelhaas, New Richmond, WI (US); Donald S. Oblak, North St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 176 days.

(21) Appl. No.: 17/756,671

(22) PCT Filed: Nov. 30, 2020

(86) PCT No.: PCT/IB2020/061288
§ 371 (c)(1),
(2) Date: May 31, 2022

(87) PCT Pub. No.: WO2021/111278
PCT Pub. Date: Jun. 10, 2021

(65) Prior Publication Data
US 2023/0038455 A1  Feb. 9, 2023

Related U.S. Application Data

(60) Provisional application No. 62/943,512, filed on Dec. 4, 2019.

(51) Int. Cl.
*B23K 1/00* (2006.01)
*B23K 20/10* (2006.01)

(52) U.S. Cl.
CPC .................................. *B23K 20/106* (2013.01)

(58) Field of Classification Search
CPC .............. B23K 20/10–106; B23K 1/06; B29C 65/085; B29C 65/087; B29C 66/1122;
(Continued)

(56) References Cited

U.S. PATENT DOCUMENTS 3,272,682 A   9/1966  Balamuth
5,707,483 A   1/1998  Nayar et al.
(Continued)

FOREIGN PATENT DOCUMENTS

CN   1854018 A  * 11/2006  ............. B29C 65/18
DE   202005016252 U1  11/2006
(Continued)

OTHER PUBLICATIONS

International Search Report for PCT Application No. PCT/IB20/61288 mailed on May 21, 2021, 3 pages.
(Continued)

*Primary Examiner* — Kiley S Stoner

(57) ABSTRACT

A rotary acoustic horn. The rotary acoustic horn includes a shaft having an axial input end and an axial output end; and at least one welding portion; wherein the welding portion comprises an outer weld face that expands and contracts with the application of acoustic energy; wherein the welding portion comprises a first opposing end portion and a second opposing end portion; wherein the welding portion comprises through holes extending substantially along an axial direction of the welding portion from the first opposing end portion to the second opposing end portion; and wherein the through holes are located between the weld face and the shaft.

16 Claims, 1 Drawing Sheet

(58) Field of Classification Search
CPC .............. B29C 66/41; B29C 66/73921; B29C 66/8122; B29C 66/8145; B29C 66/83411; B29C 66/83413; B29C 66/83417; B29C 66/9513; B29C 66/9517
USPC ...................... 228/1.1, 110.1; 156/73.1–73.6
See application file for complete search history.

(56) References Cited

U.S. PATENT DOCUMENTS

| | | | | |
|---|---|---|---|---|
| 6,059,923 | A * | 5/2000 | Gopalakrishna | .... B29C 66/9516 156/580.2 |
| 6,457,626 | B1 | 10/2002 | Sheehan et al. | |
| 6,935,548 | B2 * | 8/2005 | Reiber | ................. B23K 20/005 228/6.1 |
| 9,205,596 | B2 | 12/2015 | Short | |
| 2002/0001522 | A1 * | 1/2002 | Mukherjee | ............ F04D 29/263 416/185 |
| 2006/0225842 | A1 * | 10/2006 | Darcy | ............... B29C 66/81264 156/580.2 |
| 2010/0040903 | A1 | 2/2010 | Kalt et al. | |
| 2015/0204331 | A1 * | 7/2015 | Ellenberger | ........... B23K 20/22 228/115 |
| 2016/0076182 | A1 * | 3/2016 | Strube | .................... B32B 38/06 28/134 |
| 2017/0341256 | A1 * | 11/2017 | Schneider | ................ B26D 7/20 |

FOREIGN PATENT DOCUMENTS

| | | | | |
|---|---|---|---|---|
| JP | 2008159864 | A * | 7/2008 | |
| JP | 2009241191 | A * | 10/2009 | |
| JP | 5008787 | B2 * | 8/2012 | ............. B23K 20/10 |
| KR | 101087255 | B1 * | 11/2011 | |
| WO | 2000016966 | A1 | 3/2000 | |
| WO | WO-02060674 | A1 * | 8/2002 | ................ B06B 3/00 |
| WO | WO-2005068183 | A1 * | 7/2005 | ......... B29C 65/1432 |
| WO | WO-2015064418 | A1 * | 5/2015 | ....... A61F 13/15739 |

OTHER PUBLICATIONS

Extended European Search Report for PCT Application No. PCT/IB2020061288, mailed on Nov. 6, 2023.

* cited by examiner

ROTARY ACOUSTIC HORN

CROSS REFERENCE TO RELATED APPLICATIONS

This application is a national stage filing under 35 U.S.C. 371 of PCT/IB2020/061288, filed Nov. 30, 2020, which claims the benefit of U.S. Application No. 62/943,512, filed Dec. 4, 2019, the disclosure of which is incorporated by reference in its/their entirety herein.

BACKGROUND

In acoustic welding, such as ultrasonic welding, two parts to be joined (typically thermoplastic parts) are placed directly below an ultrasonic horn. In plunge welding, the horn plunges (travels toward the parts) and transmits vibrations into the adjacent part. The vibrations travel through this part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In this mode, typically the ultrasonic horn is stationary and the part is moved beneath it. Scan welding is a type of continuous welding in which the part is scanned beneath one or more stationary horns. In transverse welding, both the table over which the part is positioned and the part being welded remain stationary with respect to each other while moving underneath the horn or while the horn moves over them.

Many uses of ultrasonic energy for bonding and cutting thermoplastic materials involve ultrasonic horns or tools. A horn, also called a sonotrode, is an acoustical tool usually having a length of a multiple of one-half of the horn material wavelength and made of, for example, aluminum, titanium, or steel that transfers the mechanical vibratory energy to the part. (Typically, these materials have wavelengths of approximately 25 cm (10 in) for a vibration frequency of 20 kHz.) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations. There exists a need for alterative rotary acoustic horns.

SUMMARY

In one aspect, the present disclosure provides a rotary acoustic horn including a shaft having an axial input end and an axial output end; and at least one welding portion; wherein the welding portion comprises an outer weld face that expands and contracts with the application of acoustic energy; wherein the welding portion comprises a first opposing end portion and a second opposing end portion; wherein the welding portion comprises through holes extending substantially along the axial direction of the welding portion from the first opposing end portion to the second opposing end portion; and wherein the through holes are located between the weld face and the shaft.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The rotary horn of this invention can be a full wavelength acoustic rotary horn, a half wavelength horn, or a horn of a multiple of half wavelengths. The horn can be an ultrasonic horn. The horn can impart energy at a selected wavelength, frequency, and amplitude. The horn can ultrasonically weld parts over a relatively long width with a desired (often constant) amplitude at a radial weld face.

Figure 1:
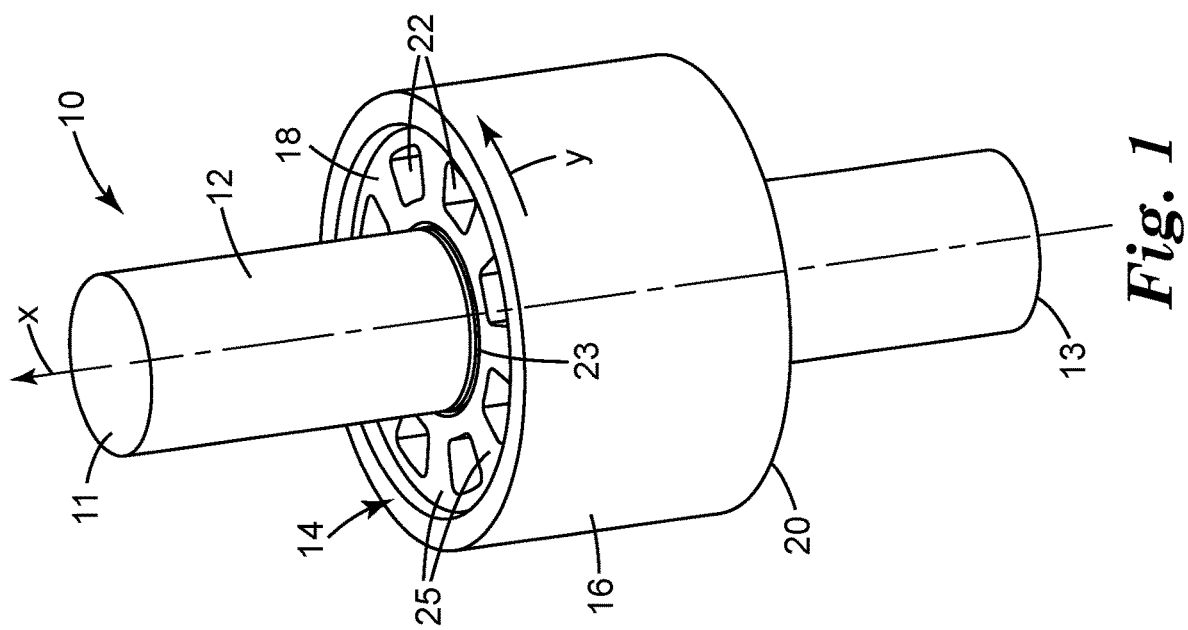
FIG. 1 is a perspective view of a horn of the present invention.

The rotary acoustic horn 10, shown in FIG. 1, includes a shaft 12 having an axial input end 11 and an axial output end 13. A welding portion 14 is positioned between the axial input end 11 and the axial output end 13 of the shaft 12. The welding portion 14 is coaxial with the shaft 12. In the embodiment of FIG. 1, the welding portion 14 can be mounted on the shaft 12. In the embodiment of FIG. 1, the welding portion 14 and the shaft 12 can be two separate pieces. In alternative embodiments, the welding portion 14 and the shaft 12 can be one piece.

The diameter of the welding portion 14 can be greater than that of the shaft 12. As shown in FIG. 1, the welding portion 14 has a outer weld face 16 having a diameter that expands and contracts with the application of ultrasonic energy. In the embodiment of FIG. 1, the outer weld face 16 is a smooth surface. In alternative embodiments, the outer weld face 16 can have features, forming a unsmooth surface. First and second opposing end portions 18, 20 are formed on the ends of the welding portion 14. The welding portion 14 can have through holes 22 extending substantially along axial direction x of the welding portion 14 from the first opposing end portion 18 to the second opposing end portion 20. The through holes 22 are located between the weld face 16 and the shaft 12.

In some embodiments, the through holes 22 can be equally spaced along the circumferential direction y of the welding portion 14. In the embodiment of FIG. 1, the through holes 22 are located at a same radius along the circumferential direction y of the welding portion 14. In other embodiments, the through holes 22 can be located at different radii along the circumferential direction of the welding portion 14. The cross sections of the through holes can have a shape of a polygon, circle or parallelogram. In some embodiments, the cross sections of the through holes can have same or different diameters. In some embodiments, the cross sections of the through holes 22 can have same or different widths and depths. In some embodiments, the cross sections of the through holes 22 can have same or different areas. In some embodiments, the cross sections of some through holes can change along the axial direction of the through holes. In some embodiments, the cross sections of some through holes can be symmetric or asymmetric along the axial direction of the through holes.

The welding portion 14 can further comprise an opposite inner face 23. The through holes 22 are located between the weld face 16 and the internal face 23. In some embodiments, the welding portion 14 can have a spoke 25 between each through hole 22 and spokes 25 extend along the radial direction of the welding portion 14.

The shaft 12 and the welding portion 14 are shown in FIG. 1 as concentric cylinders of constant diameter. For example, both the shaft and the welding portion can be cylindrical and the welding portion can be coaxial with the shaft. However, the cylinders could have varying radii or be non-concentric, and the welding portion need not be cylindrical to work with various welding configurations. For example, the welding portion could be a non-cylindrical conic section. It could be elliptical in the radial direction or can be spherical. In some embodiments, the shaft is cylindrical and the welding portion is not cylindrical.

The dimensions of the weld face 16, the internal face 23 and the through holes 22 can be selected to affect the amplitude of vibration at the weld face 16 to provide an amplitude profile that is one of: substantially uniform along the entire axial length of the weld face; substantially uniform along the entire circumferential length of the weld face; greater at the axial ends of the weld face than at the axial center; greater at the axial center of the weld face than at the axial ends; and increasing from one axial end of the weld face to the other axial end, wherein any of the amplitude profiles is attainable.

By using and placing the through holes 22 and the welding portions 14 at precise locations, the magnitude and variation in the amplitude of the weld face 16 can be controlled. The vibration mode shape of the shaft 12 can be matched with the vibration mode shape of the welding portion 14 to give a uniform amplitude across the weld face 16. While vibrating, the loading is coming from the inertial effect of the mass. If higher amplitude at the center of the weld face 16 is desired, then the through holes 22 can be made smaller. If the through holes 22 are bigger, then the amplitude at the ends of the weld face 16 is higher and tapers off toward the center. Thus, to obtain uniform amplitude, an optimum through holes 22 size is chosen.

Additionally, the center of the weld face 16 can be placed at the point of maximum amplitude in the radial direction of the shaft 12. The through holes 22 and the placement of the weld face 16 and the internal face 23 on the shaft 12 control the amplitude variation along the weld face 16. The main features for the radial deflection for these rotary horns 10 are based on the thickness of the welding portion 14; the diameters or areas of the through holes 22; and the axial location of the welding portion 14 on the shaft.

Figure 2:
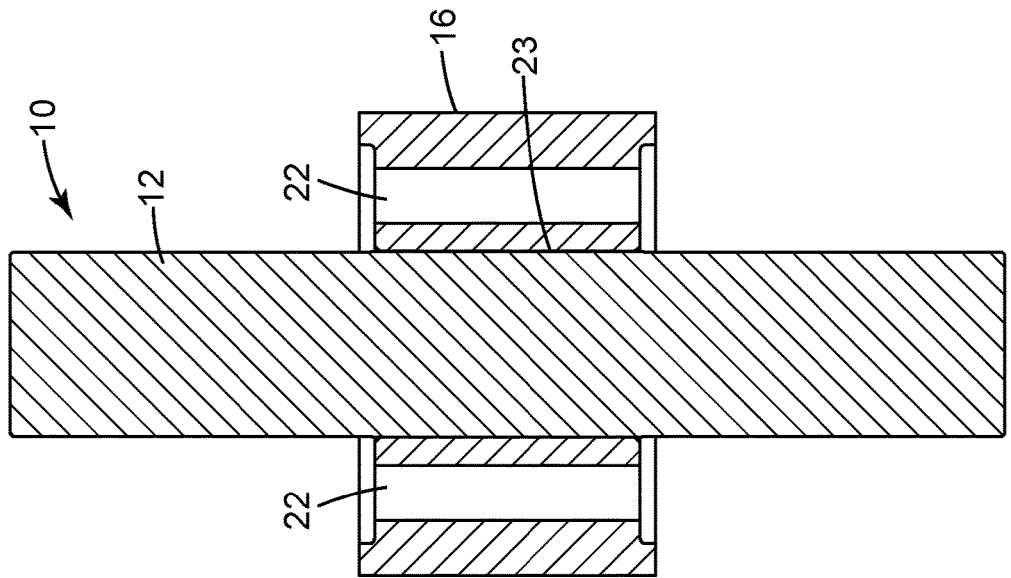
FIG. 2 is a cross-sectional view of a horn of another embodiment of the present invention.

FIG. 2 shows the rotary horn 10 having a weld width of up to 8.9 cm (3.5"). The uniformity of the amplitude is dependent on the placement of the weld face 16 and the internal face 23, the width of the through holes 22, and the space between the through holes 22. The magnitude of the amplitude is material dependent and is limited to the fatigue limit of the horn material being used. Varying the width of the through holes 22 and the space between the through holes 22 can achieve uniformity and higher magnitude of the amplitude of vibration. By using through holes 22, the bending and flexing of the 16 welding portion can be varied and controlled. Using multiple through holes 22 also helps achieve a controlled profile of the magnitude and uniformity of the amplitude of the vibration at the radial weld face.

To weld on an anvil without using multiple rotary horns (whether on rotary or flat anvils), the horns of FIG. 1 can be stacked along their length in a single unit. The configuration would look similar to a "shish-kabob" structure. The welding portions 16 can be placed at the correct vibrating position of the shaft 12 to achieve similar amplitude distribution at the radial weld face of the successive welding portions. Also the spacing between adjacent welding portions 14 can be selected so that during welding of a part of relatively constant thickness, the amplitude of vibration at each welding portion is uniform.

A stacked structure can be made by stacking individual horns or by machining a single, integrally formed of one piece structure.

The amplitude of ultrasonic vibration, and its uniformity are affected by the dimensions (such as the radial diameters of the through holes), the thickness of the welding portion that is radially outside of the through holes, the diameter of the shaft, and the length of the welding portion weld face.

The rotary horn of this invention can be made out of combination of two or more materials to achieve specific advantages, such as low power usage, an increased weld surface hardness, longer horn durability, and increased flexibility in the horn design, when compared to horns made out of one material. (Low power usage reduces heating of the horn which would cause a drop in the operating frequency. Heat generation changes the process conditions and introduces variability in the process.)

The rotary horn 10 combines the advantages of several materials. For example, the shaft of the horn can be made out of a metal alloy of steel, titanium, or aluminum (which have a lower power draw) while the welding portion can be made out of a ceramic or metal, for example, hardened steel to improve durability. Ceramic materials can include, but not limited to, silicon nitride, alumina ($Al_2O_3$), or zirconia ($ZrO_2$).

Titanium can be better at high amplitudes because of its higher factor of safety for peak stress. The power drawn and heat generated in the horn is proportional to the strain energy, which is a function of the modulus and the square of strain (square of amplitude). Thus, the power drawn in titanium and steel horns is 1.6 and 3.0 times more than that of aluminum horns, respectively. If the amplitude is doubled, the power draw is significantly higher in steel compared to aluminum and titanium. Because the thermal conductivity is higher in aluminum, the localized heat generation at the high strain region is better conducted to other parts, allowing the horn to cool quickly and uniformly.

Tool steel is far harder than aluminum and titanium. Hence there is less surface damage when a steel horn is used against an anvil. Aluminum and titanium are more ductile. This means that the presence of micro cracks are less detrimental than compared to a hardened steel horn.

Aluminum is cheaper and easier to machine than the other materials, and has good ultrasonic properties and coefficient of thermal expansion. Steel is cheaper and easier to machine before hardening than titanium. Titanium is expensive and costs significantly more to machine.

The rotary horn 10 combines the advantages of these multiple materials. With the shaft made of a metal alloy of aluminum and the welding portion made of ceramic, for example, the horn draws low power like an aluminum horn, has a hard weld surface like a ceramic, and can decrease dramatic wear in ultrasonic applications where the horn operates in an intense environment (e.g., corrosive and/or high temperature) due to the fatigue strength property of the ceramic material.

The shaft and the welding portion are adapted to maintain an interference fit. The welding portion can be placed on the shaft by any method including shrink fitting, internal screws, and adhesive. In shrink fitting, the outer diameter of the shaft is greater than the inner diameter of the welding portion. This interference must be carefully designed. If the interference is low, then the shear stress generated during the vibration causes slippage resulting in heat generation at the core-sleeve interface. If the interference is too high, the hoop tensile stress in the sleeve due to shrink fit superimposed with the vibrational stress can cause the welding portion to fail. A structural adhesive at the interface of shaft and welding portion can be used along with shrink fitting. The compressive stress from the shrink fit helps to hold the adhesive. Also, a knurling on the interface surfaces can help contain the adhesive. In shrink fitting, the core of the horn can be cooled in dry ice and the sleeve is heated in an oven. Because of the shrinkage in the outer diameter of the shaft, there is no need for heating of the welding portion.

The following working examples are intended to be illustrative of the present disclosure and not limiting.

EXAMPLES

Materials Used in the Examples

| Abbreviation | Description and Source |
| --- | --- |
| Syalon | Silicon Nitride, $Si_{6-z}Al_zO_zN_{8-z}$ (z < 1) |
| Al 7075 | Aluminum 7075 |

Resonant Frequency Test

The ultrasonic horn was connected to a Branson Horn Analyzer model A-200 A (Branson Ultrasonics Corp., Danbury, CT) The instrument finds the resonant frequency of the ultrasonic tool.

The ultrasonic horn was subsequently connected to a Sonics & Materials Inc. Horn Analyzer model HTS (Newtown, CT) The instrument also finds the resonant frequency of the ultrasonic tool.

Ultrasonic Amplitude Test

The ultrasonic horn was connected to a 1:1.0 gain 35 kHz booster from Telsonic (Bronschhofen, Switzerland), part number K17183-13. A Telsonic 35 kHz converter, part number SE3512C, was connected to the booster. A 35 kHz Telsonic power supply, part number MAG-W035012-M-D-02, was connected to the converter. The power supply conducted a resonant frequency sweep and determined the resonant frequency of the horn. The power supply was run at a 10% amplitude setting and the peak to peak vibration amplitude of the circumferential roll face 16 and the shaft end face 13 were measured by a MTI-2000 Fotonic Sensor (MTI Instruments Inc., Albany, NY). The power supply's average and peak power were measured from the Telsonic power supply using the Telsosave software. The amplitude setting was increased in increments of 10%, and the corresponding amplitude on the weld face 16, and the shaft end, 13 were measured.

EXAMPLES

A shaft of 2.17 inches (55.1 mm) diameter and 11.75 inches (298.5 mm) long was fabricated from Al 7075. A roll of diameter 5.48 inches (139.2 mm) and 3.5 (88.9 mm) inches long of was created from Syalon with a density>3.18 g/cc. The roll had eight equally circumferentially spaced through holes that had an inner radius of 1.43 inches (36.32 mm) and outer radius of 2.09 inches (53.08 mm) with radial sides that are 25-degree arc length about the axis of the roll.

The roll and shaft were assembled with an interference fit between the diameter of the bore in the roll and the outer diameter of the shaft. The shaft was immersed in liquid nitrogen and the roll was heated to a temperature of 400° F. (201° C.). The shaft was inserted through the bore of the roll at room temperature, and axially centered with respect to the roll For the Resonant Frequency Test, the Branson A-200 A measured a resonant frequency of 35,580 Hz. The Sonics & Materials HTS measured a resonant frequency of 35,303 Hz.

The Ultrasonic Amplitude Test was conducted at a frequency of 35,236 Hz. The test results are shown in Table 1 (below).

TABLE 1

| Power Supply % Amplitude | Peak to Peak Amplitude Roll Face, mils (micrometers) | Peak to Peak Amplitude Shaft End, mils (micrometers) | Power, Watts | Peak Power, Watts |
|---|---|---|---|---|
| 10 | 0.01 (0.30) | 0.07 (1.78) | <1 | <1 |
| 20 | 0.08 (2.03) | 0.13 (3.30) | 5 | 8 |
| 30 | 0.12 (3.05) | 0.20 (5.08) | 12 | 22 |
| 40 | 0.16 (4.06) | 0.26 (6.60) | 20 | 38 |
| 50 | 0.20 (5.08) | 0.33 (8.38) | 28 | 57 |
| 60 | 0.23 (5.84) | 0.39 (9.90) | 48 | 70 |
| 70 | 0.26 (6.60) | 0.44 (11.17) | 70 | 103 |
| 80 | 0.30 (7.62) | 0.48 (12.19) | 112 | 131 |

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A rotary acoustic horn comprising,
   a shaft having an axial input end and an axial output end; and
   at least one welding portion comprising an outer weld face, a first opposing end portion and a second opposing end portion;
   wherein the welding portion is positioned between the axial input end and the axial output end of the shaft such that the outer weld face has a diameter that expands and contracts with the application of acoustic energy;
   wherein the welding portion comprises through holes located between the weld face and the shaft and extending substantially along an axial direction of the welding portion from the first opposing end portion to the second opposing end portion, and
   wherein the sections of at least some through holes change long an axial direction of the through holes.

2. The rotary acoustic horn of claim 1, wherein the welding portion is mounted on the shaft.

3. The rotary acoustic horn of claim 1, wherein the through holes are equally spaced along the circumferential direction of the welding portion.

4. The rotary acoustic horn of claim 1, wherein the through holes are located at different radiis along the circumferential direction of the welding portion.

5. The rotary acoustic horn of claim 1, wherein the cross sections of the through holes have a shape of a polygon, circle or parallelogram.

6. The rotary acoustic horn of claim 1, wherein the cross sections of the through holes have different diameters.

7. The rotary acoustic horn of claim 1, wherein the cross sections of the through holes have different areas.

8. The rotary acoustic horn of claim 1, wherein the shaft is formed of a metal alloy of steel, titanium, or aluminum and the wherein the welding portion is formed of a ceramic.

9. The rotary acoustic horn of claim 1, wherein the welding portion further comprises an opposite internal face and wherein the through holes are located between the weld face and the internal face.

10. The rotary acoustic horn of claim 1, wherein the welding portion comprises spokes between each through hole and wherein the spokes extend along the radial direction of the welding portion.

11. The rotary acoustic horn of claim 1, wherein the shaft is cylindrical, the welding portion is cylindrical, and the welding portion is coaxial with the shaft.

12. The rotary acoustic horn of claim 1, wherein the shaft is cylindrical and the welding portion is not cylindrical.

13. The rotary acoustic horn of claim 9, wherein the dimensions of the weld face, the internal face and the change in the cross sections of at least some through holes along the axial direction of the through holes are selected to affect the amplitude of vibration at the weld face to provide an amplitude profile that is greater at the axial ends of the weld face than at the axial center.

14. The rotary acoustic horn of claim 1, wherein the shaft and the welding portion are adapted to maintain an interference fit.

15. The rotary acoustic horn of claim 9, wherein the dimensions of the weld face, the internal face and the change in the cross sections of at least some through holes along the axial direction of the through holes are selected to affect the amplitude of vibration at the weld face to provide an amplitude profile that is greater at the axial center of the weld face than at the axial ends.

16. The rotary acoustic horn of claim 9, wherein the dimensions of the weld face, the internal face and the change in the cross sections of at least some through holes along the axial direction of the through holes are selected to affect the amplitude of vibration at the weld face to provide an amplitude profile that is increasing from one axial end of the weld face to the other axial end.

* * * * *